Oct. 13, 1964   H. DERSCHMIDT ETAL   3,152,647
ROTOR BLADE CONTROL MECHANISM FOR ROTARY WING AIRCRAFT
Filed Sept. 19, 1961   3 Sheets-Sheet 1

Inventors:
HANS DERSCHMIDT, GERHARD ECK
MARTIN MÜLLER, Josef SCHEKULIN

BY  M. Glew and Toren
ATTORNEYS

Oct. 13, 1964  H. DERSCHMIDT ETAL  3,152,647
ROTOR BLADE CONTROL MECHANISM FOR ROTARY WING AIRCRAFT
Filed Sept. 19, 1961  3 Sheets-Sheet 3

Inventor:
HANS DERSCHMIDT, GERHARD ECK
MARTIN MÜLLER, JOSEF SCHEKULIN
BY M. Glew and Toren
ATTORNEYS Patented Oct. 13, 1964

3,152,647
ROTOR BLADE CONTROL MECHANISM FOR ROTARY WING AIRCRAFT
Hans Derschmidt and Gerhard Eck, Munich, and Martin Müller and Josef Schekulin, Ottobrunn, near Munich, all of Germany, assignors to Bolkow-Entwicklungen Kommanditgesellschaft, Ottobrunn, near Munich, Germany
Filed Sept. 19, 1961, Ser. No. 139,299
Claims priority, application Germany Oct. 1, 1960
1 Claim. (Cl. 170—160.1)

This invention relates in general to rotary wing aircraft and control mechanism for the rotor blades thereof, and in particular to a new and useful rotor construction wherein the blades are mounted on the rotor for rotational lead-lag movement therewith and for pivotal movement about their mountings and including improved means for faithfully changing and transmitting the rotor blade pitch angle during their rotation and pivotal movement about their rotor mountings.

The present invention has particular application in respect to rotary wing aircraft where the rotor blades are pivotally mounted on the rotor hub for controlled accelerating (lead-lag) and decelerating movement during their overall rotation along with the rotor hub. The blades are controlled in this manner because the thrust which acts on the blades which are moved into the forward portion of their cycle of rotation in respect to the flying direction is greater than at the trailing portion of their cycle and this condition is aggravated as the forward speed of the aircraft is increased. The uneven thrust distribution in respect to the forward and trailing cycles of movement of the blades produces in some instances a second harmonic oscillation of the thrust forces causing vibration of the rotor which in turn charges the blades with additional bending forces.

In order to decrease the unevenness or non-uniformity of the thrust and the vibration of the rotor which occurs at high forward speeds, it has been proposed to perform a cyclic control which takes place twice per rotation of the rotor. These controls are provided to rotate the blades about their pivotal mountings on the rotors. In such instances, the rotors are still subject to undue harmonic stressing caused by the harmonic forces which are set up.

In accordance with the present invention, non-uniformity of the upthrust or aerodynamic lift and any increase of the bending moment of the blades is prevented by controlling the pitch or adjusting angle, i.e. the disposition of the blades in respect to their longitudinal axes, while the blades are being controlled in respect to their pivotal or lead-lag movement at their pivotal connections to the rotor hub.

A feature of the construction in the present invention is that the disposition of the blade in respect to its longitudinal axis is controlled uniformly throughout all of the blade movements which are effected about its pivotal mounting on the rotor hub. It is possible to obtain, in accordance with the invention, a second harmonic cyclic control by influencing the adjusting or pitch angle independently from the rotary angle at which the blade is disposed, so that the blades, with their adjusting angle, are always rotated downwardly, for example, independently of whether or not they are rotated forwardly or rearwardly in respect to their pivotal mounting. In addition, the mechanism is provided to achieve a larger adjusting angle in respect to the longitudinal axis of the blades when they assume an extended position which corresponds to a rotary angle of zero.

Accordingly, it is an object of this invention to provide an improved rotor construction for a rotary wing aircraft including means for uniformly pivoting the rotor blade about its longitudinal axis independently of the movement of the blade about its pivotal connection to the rotor.

A further object of the invention is to provide an improved transmitting mechanism for pivoting a helicopter blade.

A further object of the invention is to provide a transmitting mechanism for pivoting a helicopter blade about its longitudinal axis independently of its pivotal movement about its pivotal connection to a rotating hub which includes means for faithfully varying the angle of pivot of the blade about its longitudinal axis during the rotation thereof.

A further object of the invention is to provide a mechanism for faithfully pivoting a rotor blade of a rotary wing aircraft about its longitudinal axis as it is adjusted about its pivotal connection to a rotating rotor and wherein a greater pivotal movement of the blade about its longitudinal axis is effected when the rotor blade extends substantially radially outwardly from the axis of rotation of the rotor.

A further object of this invention is to provide a control mechanism for operating a helicopter blade during its rotation which is simple in design, rugged in construction and economical to manufacture.

The various features of novelty which characterize the invention are pointed out with particularity in the claim annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
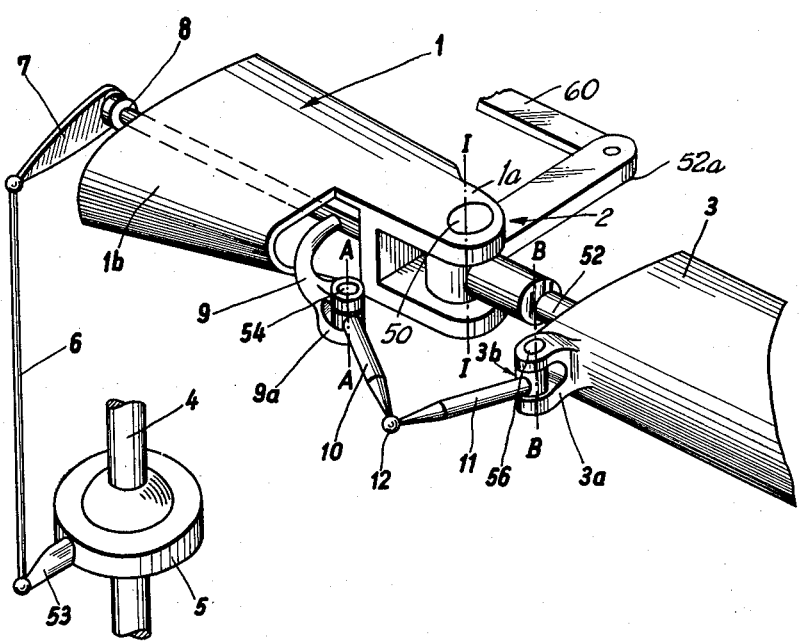
FIG. 1 is a fragmentary perspective view of the rotor of a rotary wing aircraft having a mechanism for controlling the pitch angle (that is, the angle of tilt of a rotor blade about its longitudinal axis) constructed in accordance with the invention.
Figure 2:
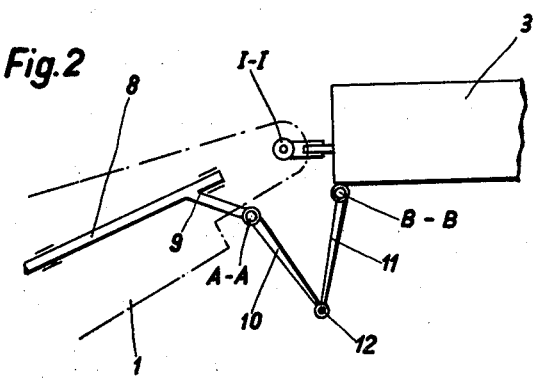
FIG. 2 is a schematic representation of a plan view of FIG. 1.

Referring to the drawings in particular, the invention embodied therein in FIGS. 1 and 2 includes a rotatable rotor head generally designated 1 having a hollow extending portion 1b for each blade (only one of which is indicated for clarity of illustration purposes). Each extending portion is provided with a bifurcated mounting 1a which carries a drag pivot pin 50 to which is secured a connecting rod member 52 of a rotor blade 3. The connecting rod member 52 is formed as a crank arm with a portion 52a pivotally connected to a connecting rod 60 which is moved in a timed manner by mechanism (not shown) to cause cyclical pivotal lead and lag movement of the blade 3 about axis I—I. The operating mechanism is similar to that shown in co-pending applications of applicant, Serial No. 125,784 filed July 21, 1961, Serial No. 42,700 filed July 13, 1960, now Patent No. 3,107,733 and an application of the same assignee, Serial No. 133,937 filed August 25, 1961. The rotor blade 3 is mounted for pivotal movement about the center of the pivot pin 50 on the rotor head 1 as the rotor head itself is rotated by a main rotor shaft partially indicated at 4. Means (not shown) are provided to rotate the blade 3 about an axis I—I coinciding with the center of the pivot pin 50 for the purpose of advancing or accelerating the blade during a portion of its rotative cycle and for retarding or decelerating the blade through a latter portion of its rotative movement. The drag pivot pin 50 and the arm 52 which comprises a drag joint 2 is only schematically indicated. The means for rocking the rotor blade 3 about the axis I—I form no part of the present invention and have not been illustrated or described for purposes of clarity.

In accordance with the present invention, means are provided to faithfully pivot the blade 3 about its longitudinal axis which coincides with the center of the rod member 52 regardless of its angular disposition in respect to the axis I—I. The mechanism includes a swash plate 5 which is affixed to the rotor axis 4 for inclination about an axis and which carries extending arms 53 in a number corresponding to the number of blades 3. The arms move upwardly and downwardly in dependence on the inclination of the swash plate 5 to articulate a push rod 6 and rock a lever 7 to oscillate a shaft 8 upon which it is affixed for oscillation therewith. The shaft 8 is arranged on the interior of the hollow portion 1b of the rotor 1 and is disposed in alignment with the axis of the rod 52, and is perpendicular to the axis I—I.

The shaft 8 carries a cured arm 9 having a bifurcated end which carries a pivot pin 54 having a central axis A—A. A link 10 is rotatable on the pivot pin 54 and is connected to a similar link of identical length which is pivotal on a pin 56 having a central axis B—B. The links 10 and 11 are connected by means of a universal or ball joint 12. The pin 56 is held in a bifurcated lever arm member 3a formed as an extension of the rotor blade 3 and the joint thus formed is designated generally by 3b.

In accordance with the invention, the axes A—A and B—B of the joints holding the rods 10 and 11, respectively, extend parallel to the joint axis I—I of the rotor blade 3 and are arranged at an equal distance from the axis I—I. Further, as seen in FIG. 2, the links 10 and 11 are of equal length. Therefore, the angular movement of the shaft 8 is transmitted via the links 10 and 11 and the arm 3a in a faithful angular reproduction to the rotor blade 3.

Figure 3:
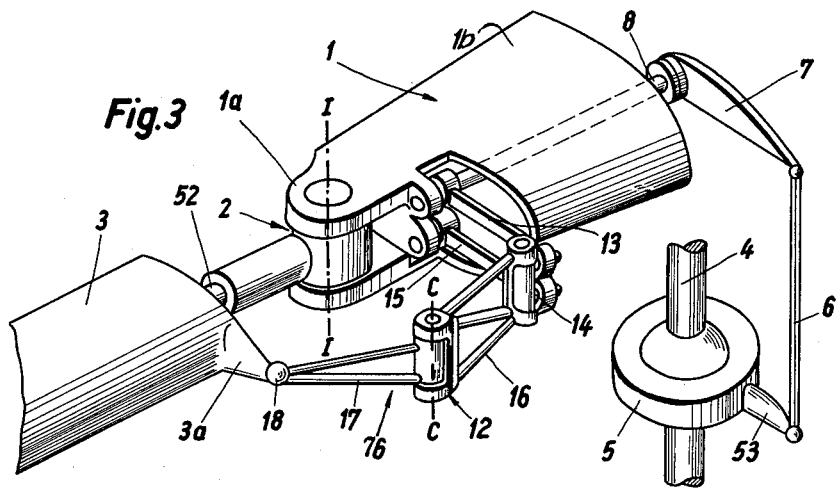
FIG. 3 is a fragmentary perspective view of another embodiment of the invention.

In FIG. 3, a slightly different embodiment is indicated on a rotor and wing construction which is identical to that indicated in FIG. 1 and which is similarly numerically designated. In this embodiment, a reproduction or transmitting linkage generally designated 76 is provided which compares with the linkage formed by the parts interconnecting the shaft 8 with the arm 3a of the rotor 3 in FIG. 1. In this embodiment, however, in addition to a lever 13 which is connected to the shaft 8, there is provided a parallel linkage arm 15 which is connected by means of a combined joint pin 14 to a lever 16. The joint pin 14 is parallelly guided by the provision of the additional link 15. Oscillation of the shaft 8 is transmitted via the link 16 through a joint pin 12 to a link 17 which is connected through a ball joint to the lever arm extension 3a of the rotor blade 3.

When the swash plate 5 is inclined, the lever 7 is oscillated with the shaft 8 and due to the parallel guiding by the lever 13 and the link 15, the links 16 and 17 including the ball joint 18 are lifted or lowered in the direction of the axis I—I. The lever arm extension 3a transforms this lifting or lowering of the ball joint into a change of the pitch angle of the blade 3. By contrast, lead-lag movements of the rotor blade about its joint axis I—I do not affect the pitch angle of the blade, even if the inclination of the swash plate 5 is large or small.

Figure 4:
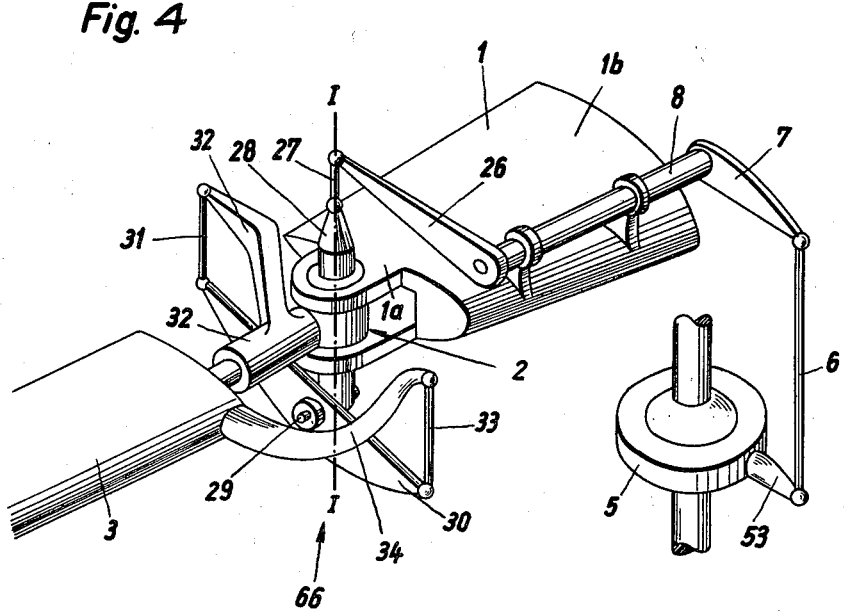
FIG. 4 is a fragmentary perspective view of still another embodiment of the invention.

In FIG. 4, a further embodiment of the invention is indicated which includes a transmission mechanism generally designated 66. In this embodiment, the motion of the swash plate 5 is transmitted to a piston 28 which is mounted concentrically relative to the joint axis I—I and which is movable in an axial direction in respect thereto. The movement of the piston 28 is transferred into an angular movement of the rotor blades via a deflecting lever 30 mounted at one end of the piston and by means of control rods 31 and 33. In the control arrangement shown in this figure, the adjustment of the adjusting angle is not influenced when the rotor blade rotates.

The swash plate 5 controls the push rod 6 and the lever 7 which is secured to the end of the shaft 8. Contrary to the embodiments of FIG. 1, the shaft 8 is mounted at the outside of the rotor head arm 1b. At the end of the shaft 8 which is on the side of the rotor blade, there is arranged a lever 26 which lever is connected with the piston 28 by means of a push rod 27 which is articulated at one of the ends of the lever 26. The piston 28 is axially displaceable concentrically relative to the axis I—I within the joint 2. At the lower end of the piston 28 there is secured a pin 29 which extends perpendicular to the piston axis. On the pin 29 there is symmetrically mounted a lever 30. At one end of the lever 30 there is articulated a rod 31 whose other end bears or engages at an arm 32a of a bearing sleeve 32. The other end of the lever 30 is in connection with a control member 34 of the rotor blade 4 via a rod 33.

A control movement of the swash plate is translated or converted into a rotary movement of the lever 26 in a known and described manner, thereby that the piston 28 which is connected with a lever 26 via the rod 27 is moved up and down axially in the interior of the joint. The lever 30 converts this axial movement of the piston 28 via the rods 31 and 33 into a rotary movement which is transmitted to the member 34. As all angular movements are guided through the center of the joint 2, the adjustment angle cannot be influenced by the rocking movement of the rotor blade.

While specific embodiments of the invention have been shown and described in detail to illustrate the application of the inventive principles, it will be understood that the invention may be embodied otherwise without departing from such principles.

What is claimed is:

A blade disposition control device for a rotary wing aircraft having rotor blades mounted for lead-lag pivotal movement about a lead-lag axis and for pivotal movement about their own longitudinal axes for pitch angle change, comprising a rotor head, a substantially radially extending shaft rotatable in said rotor head, an arm carried by said shaft for rotation therewith and extending outwardly from said shaft and terminating in a first journal bearing, a first link pivotal on said first journal bearing, a blade pivotally mounted on said rotor head for pivotal lead-lag movement about an axis substantially perpendicular to said shaft axis, means pivotally supporting said blade for pivotal movement about its longitudinal axis, means on said blade defining a second journal bearing which is substantially perpendicular to the longitudinal axis of said blade, a second link pivoted on said second journal bearing, ball joint means connecting said first and second links, said first and second journal bearings and the lead-lag axis of said blade being substantially parallel when said blade is oriented at zero pitch, said first and second journal bearings being spaced at an equal distance away from said blade lead-lag axis, and blade adjusting angle means carried by said rotor head and connected to said shaft to oscillate said shaft and to pivot said blade about its own longitudinal axis independently of the movement of said blade about its lead-lag axis.

References Cited in the file of this patent

UNITED STATES PATENTS

| | | |
|---|---|---|
| 2,418,030 | Hirsch | Mar. 25, 1947 |
| 2,511,687 | Andrews | June 13, 1950 |
| 2,658,576 | Mosinskis | Nov. 10, 1953 |
| 2,692,650 | Pullin et al. | Oct. 26, 1954 |
| 2,957,526 | Derschmidt | Oct. 25, 1960 |

FOREIGN PATENTS

| | | |
|---|---|---|
| 581,797 | Great Britain | Oct. 24, 1946 |
| 496,055 | Italy | June 30, 1954 |